Aug. 25, 1953 — R. T. SPENCER — 2,649,774
ADJUSTABLE WEIGHT-BIASED RELIEF VALVE
Filed Sept. 22, 1948 — 6 Sheets-Sheet 4
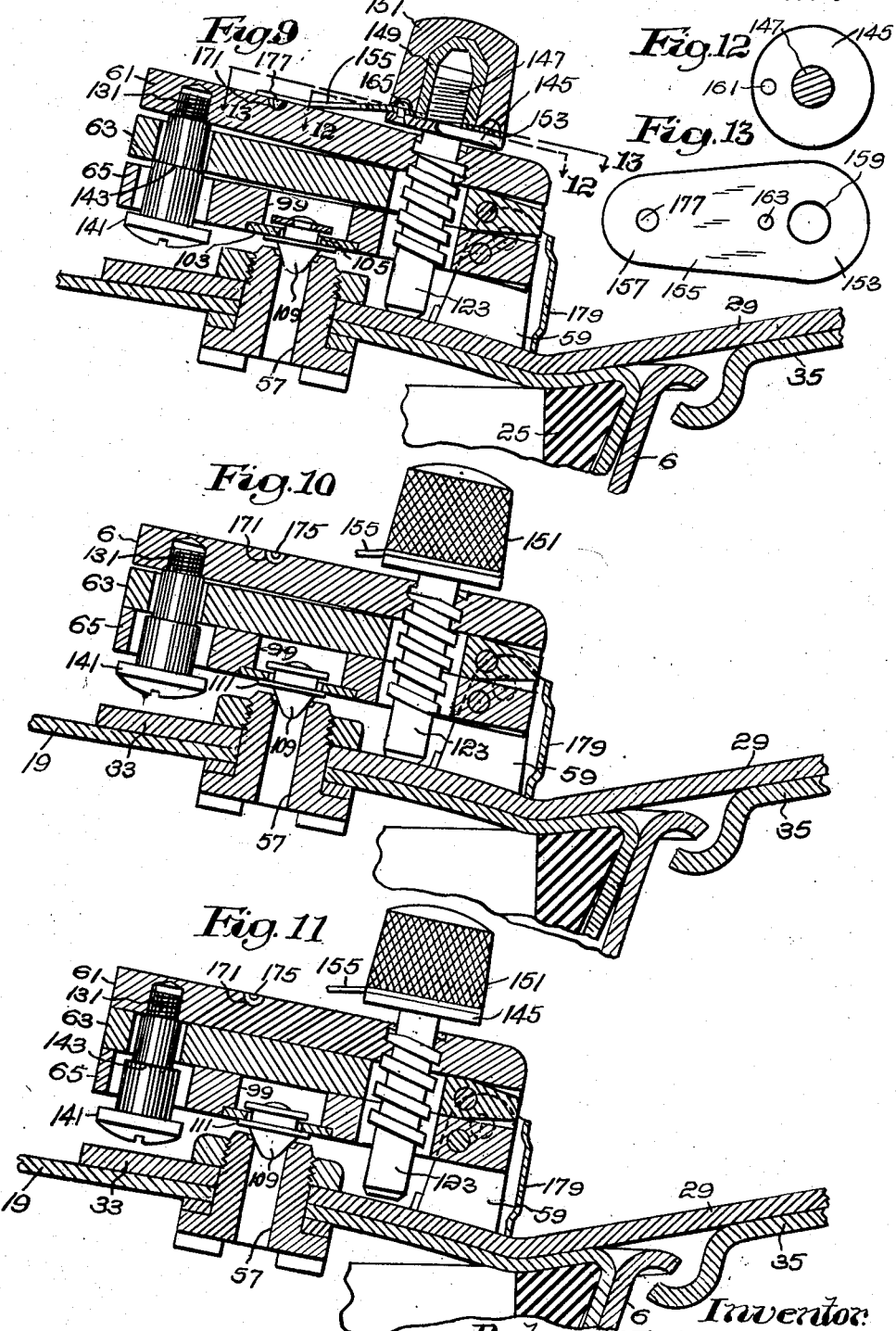

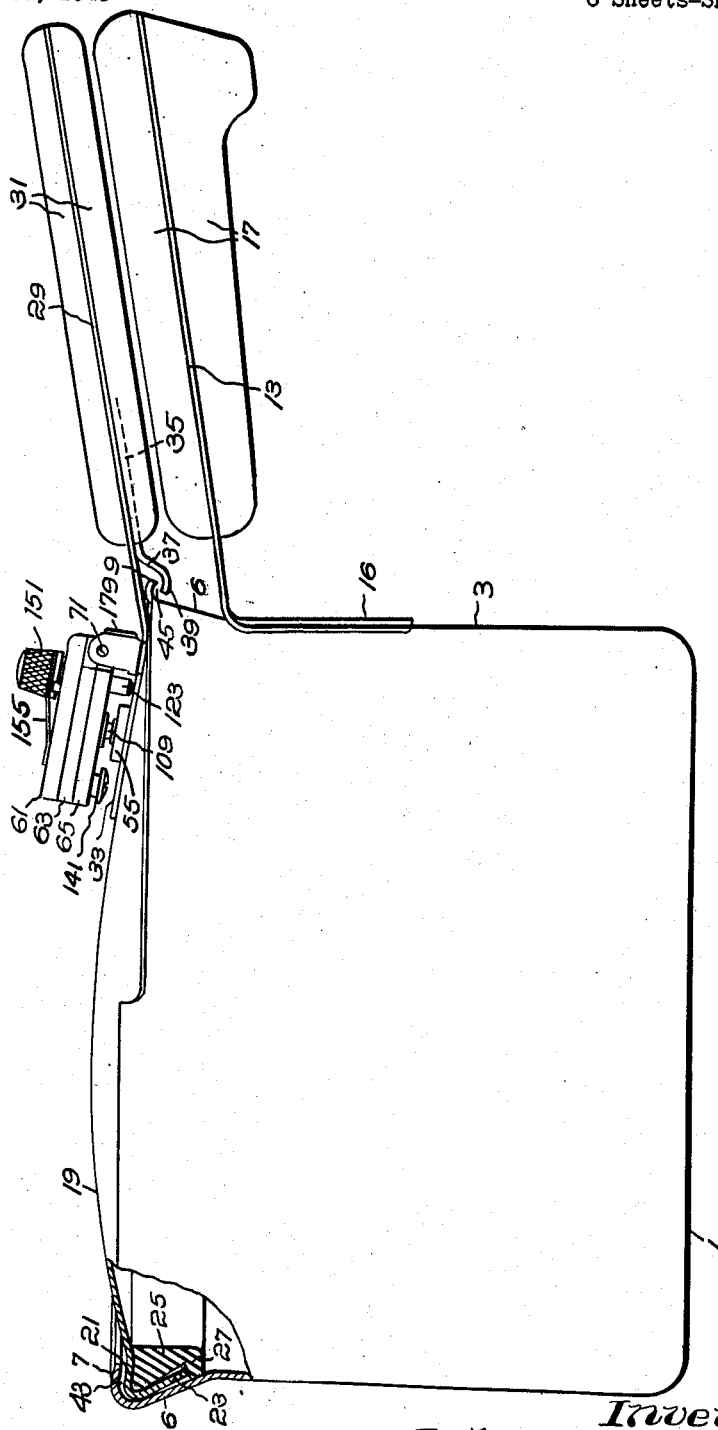

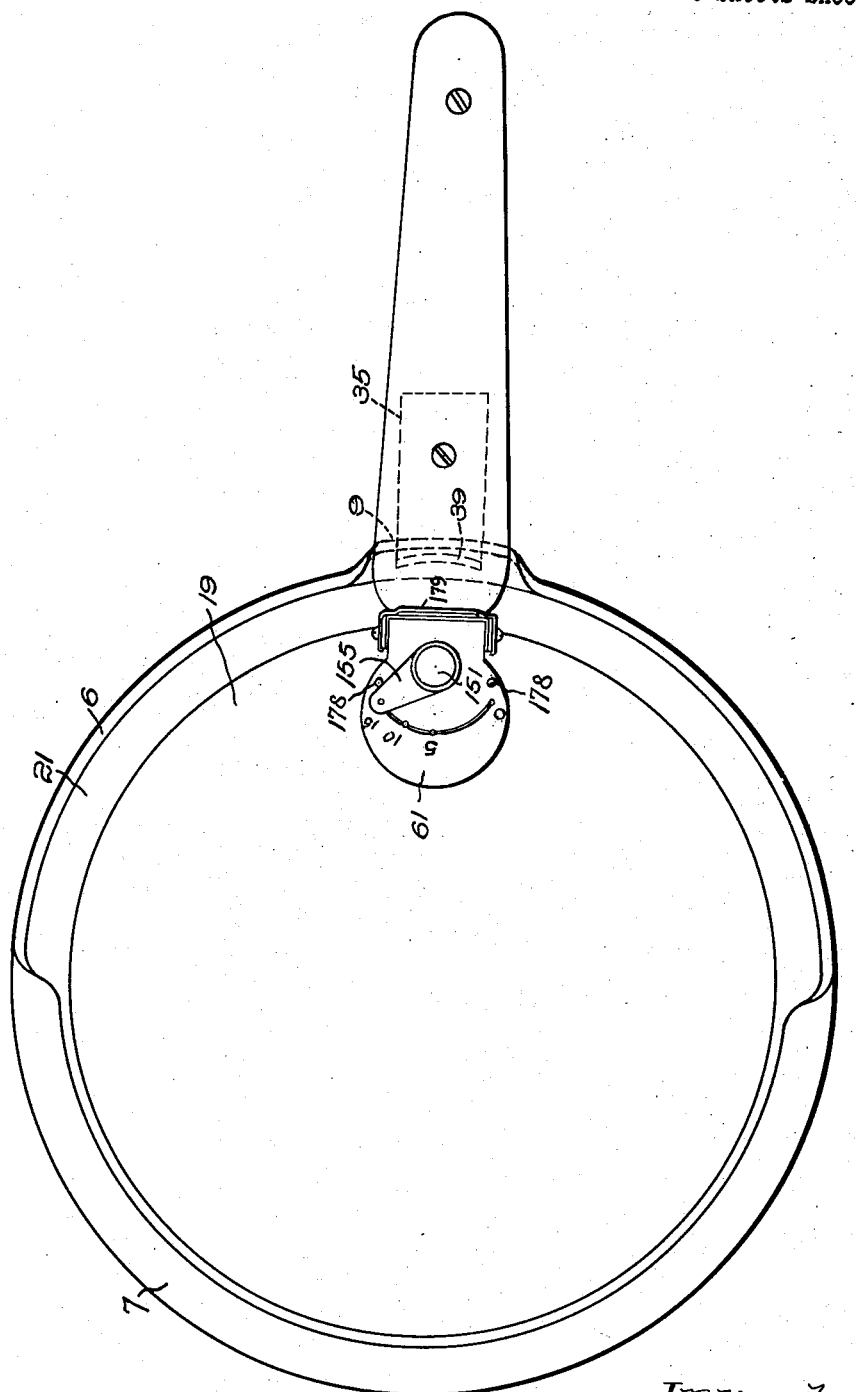

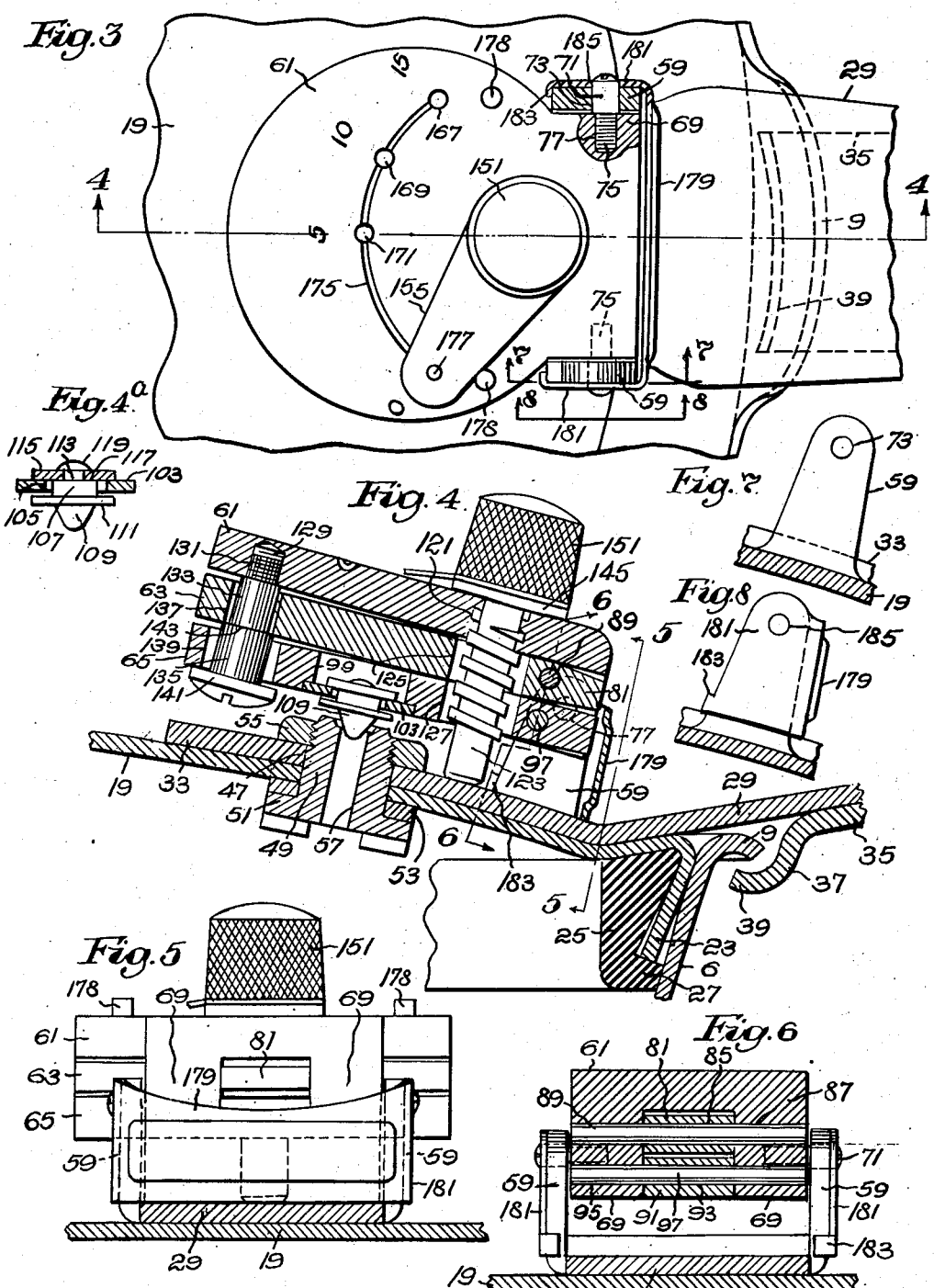

Aug. 25, 1953  R. T. SPENCER  2,649,774
ADJUSTABLE WEIGHT-BIASED RELIEF VALVE
Filed Sept. 22, 1948  6 Sheets-Sheet 5
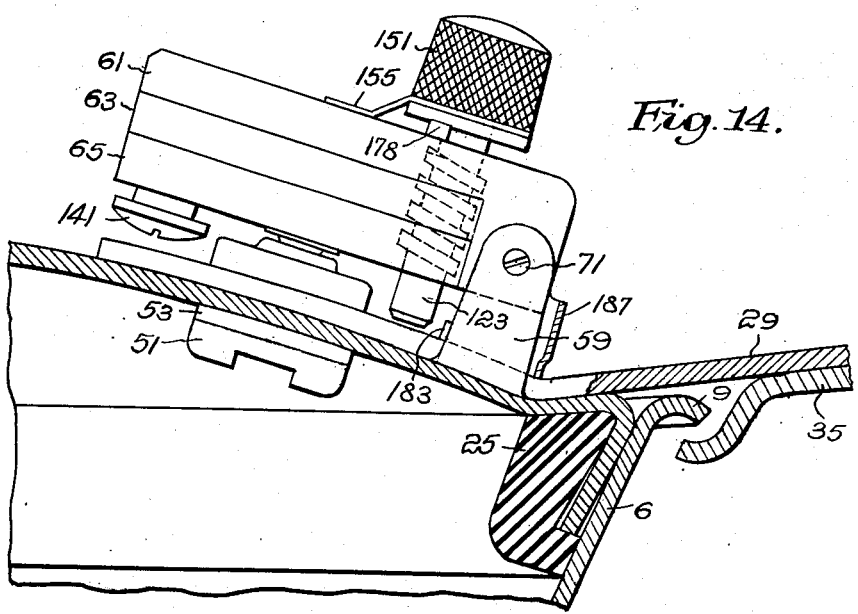
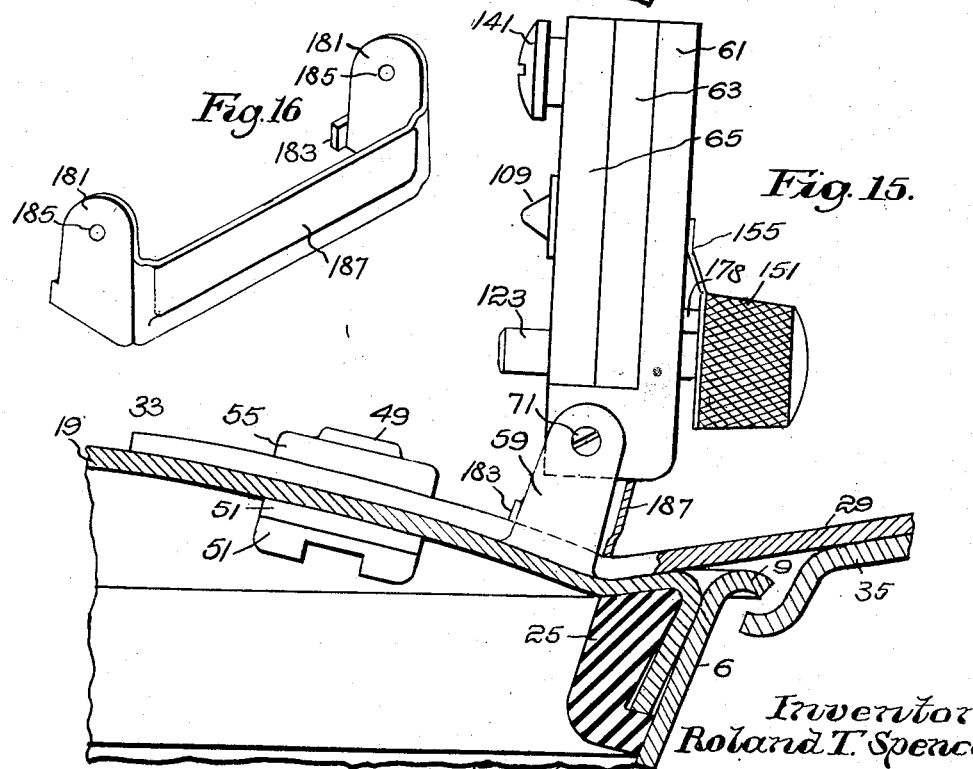
Inventor.
Roland T. Spencer, Aug. 25, 1953   R. T. SPENCER   2,649,774
ADJUSTABLE WEIGHT-BIASED RELIEF VALVE
Filed Sept. 22, 1948   6 Sheets-Sheet 6
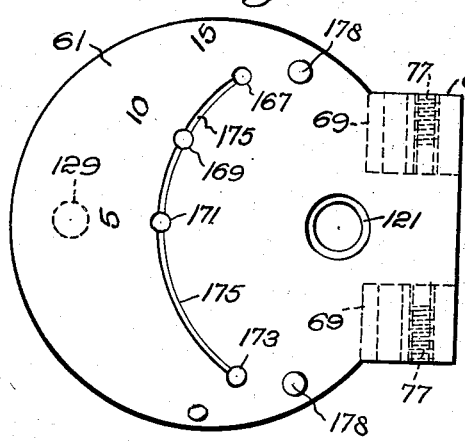
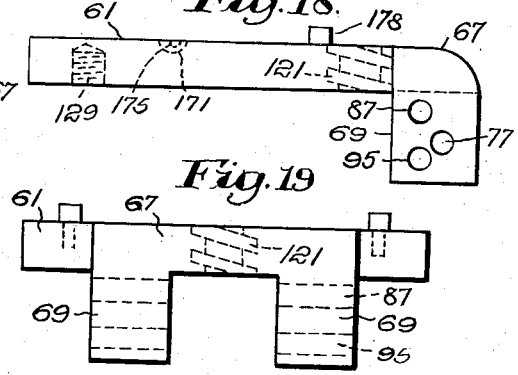
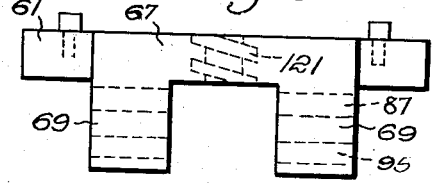
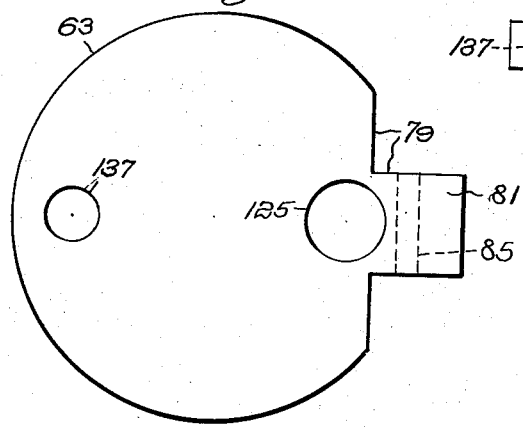
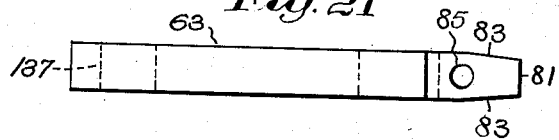
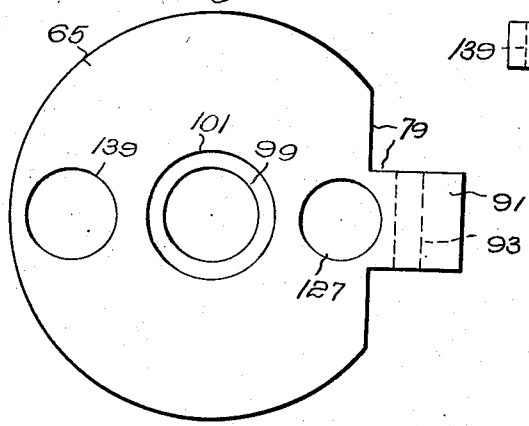
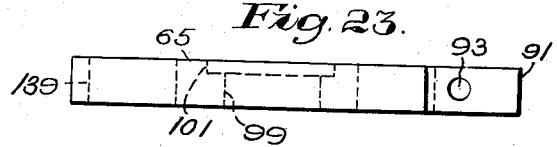
Inventor:
Roland T. Spencer.
By Emery, Booth, Townsend, Miller & Weidner,
Attys Patented Aug. 25, 1953

2,649,774

UNITED STATES PATENT OFFICE 2,649,774

ADJUSTABLE WEIGHT-BIASED RELIEF VALVE

Roland T. Spencer, Rome, N. Y., assignor to Revere Copper and Brass Incorporated, Rome, N. Y., a corporation of Maryland Application September 22, 1948, Serial No. 50,583

17 Claims. (Cl. 137—524)

My invention relates to pressure cookers.

The invention has among its objects improved means for controlling and selectively regulating the pressure within a pressure cooker.

The above and other objects of the invention will be best understood from the following description when read in the light of the accompanying drawings of several specific embodiments of the invention selected for illustrative purposes, while the scope of the invention will be more particularly pointed out in the appended claims.

In the drawings—

Fig. 1 is a front elevation of a pressure cooker according to the invention, with parts in section;

Fig. 2 is a plan of the pressure cooker according to Fig. 1;

Fig. 3 is a plan of a fragment of the pressure cooker according to Figs. 1 and 2 on an enlarged scale, with parts in section;

Fig. 4 is a section on the line 4—4 of Fig. 3;

Fig. 4a illustrates a detail;

Figs. 5 and 6 are, respectively, sections on the lines 5—5 and 6—6 of Fig. 4;

Figs. 7 and 8 are, respectively, sections on the lines 7—7 and 8—8 of Fig. 3, with parts omitted;

Figs. 9, 10 and 11 are sections corresponding to Fig. 4, with the parts in different operative positions;

Figs. 12 and 13 are, respectively, sections on the lines 12—12 and 13—13 of Fig. 9, with parts omitted;

Fig. 14 is an elevation, with parts in section, of a fragment of a pressure cooker having a modified form of controlling valve mechanism shown in its operative position;

Fig. 15 is an elevation according to Fig. 14, with the parts in a different operative position;

Fig. 16 is an isometric view of a shield employed in the pressure cooker according to Figs. 14 and 15;

Fig. 17 is a plan of the upper weight of the controlling valve according to Figs. 1 to 16;

Fig. 18 is a side elevation of the weight according to Fig. 17;

Fig. 19 is an end elevation, as viewed from the right, of the weight according to Figs. 17 and 18;

Fig. 20 is a plan of the intermediate weight according to Figs. 1 to 16;

Fig. 21 is a side elevation of the weight according to Fig. 20;

Fig. 22 is a bottom view of the lower weight according to Figs. 1 to 16; and

Fig. 23 is a side elevation of the weight according to Fig. 22.

Aside from the pressure controlling mechanism, the pressure cooker illustrated is generally like those shown by co-pending applications of William A. Welden, Serial Number 677,043, filed June 15, 1946, now Patent No. 2,614,723, and Serial Number 695,128, filed September 6, 1946, now Patent No. 2,614,725, while the pressure controlling mechanism is generally like that shown by co-pending application of Glenn C. Wyman, Serial Number 26,862, filed May 13, 1948, now Patent No. 2,614,724, all three patents issuing on October 21, 1952, the present invention constituting an improvement on the last.

As illustrated, the pressure cooker comprises a container, preferably formed of sheet metal such as stainless steel, having a bottom wall 1 and cylindrical side walls 3. Adjacent their upper edges the side wall are formed to present an outwardly flared frusto-conical portion 6 extending entirely about said walls. At its upper edge this frusto-conical portion is formed to present a narrow inwardly turned lip 7 extending about said portion for approximately 180°. At the side of the frusto-conical portion diametrically opposite the lip 7 said portion is formed with a narrow outwardly projecting downwardly turned lip 9 of shorter angular extent than the lip 7. Carried by the container is a radially projecting handle 13 having a base portion 16 secured to the cylindrical walls of the container, preferably by welding, this handle being provided with the handle grips 17.

As shown, the cover, which also is formed of sheet metal, preferably stainless steel, is shaped to present a dome-like central portion 19 surrounded by a flattened relatively narrow annular flange 21. Integral with the outer peripheral edge of this flange is an inwardly turned downwardly extending frusto-conical flange 23 extending entirely about the cover. Carried by the cover at its under side is a gasket ring 25 of greater height than the flange 23, this ring being formed of flexible resilient material such as synthetic rubber, and being shaped to fit into the space between the flanges 21 and 23 and to provide a lower portion 27 which projects radially beyond the outer side of the flange 23 at its lower edge so as to bear uninterruptedly against the inner wall of the frusto-conical portion 6 of the container when the cover is assembled with the latter.

As shown, the cover is provided with a radially projecting handle 29 provided with the handle grips 31. This handle is provided with a base portion 33 which and the adjacent portion of the body of the handle conform to the upper sides of the dome-shaped portion 19 and annular flange 21 of the cover to which they are secured preferably by welding. Secured to the under side of the handle 29, also preferably by welding, is the base 35 of a strip-like member which, at its end adjacent the cover, is provided with a downturned portion 37, which latter, at its lower end, is upwardly turned to form a hook 39.

When the parts are in the position shown by the drawings the cover is removably retained on the container by the container lip 7 positioned above the cover flange 21 and by the container lip 9 positioned above the cover hook 39. When the cover is initially placed on the container a clearance 43 exists between the container lip 7 and cover flange 21, and an equal clearance 45 between the container lip 9 and cover hook 39, the projecting portion 27 of the gasket ring 25 bearing against the frusto-conical container portion 6 so as to seal the joint between the cover and container and thus permit pressure to build up in the cooker. When the pressure builds up and the cover rises to take up the clearances 43 and 45, the gasket ring because of its resiliency and the pressure in the cooker remaining in contact with the frusto-conical container portion 6 so that at all times the gasket renders the joint between the cover and the container steam-tight.

As shown, the base portion 33 of the handle 29 and the cover portion 19 immediately below said base portion are jointly formed to provide a perforation 47 (Fig. 4) through which extends the shank portion 49 of a plug having a head 51 below the cover. Surrounding the shank, and positioned between the head and the under side of the cover, is a resilient gasket washer 53. The upper projecting end of the plug is screw-threaded, and is received in a nut 55 resting against the upper side of the base portion 33 of the handle 29. This nut serves to secure the plug in assembled relation with the other parts and to compress the gasket washer 53 for rendering the joint between the plug and the cover fluid-tight. The plug is further provided with a longitudinal through bore 57 serving as a vent passage for the cover.

As illustrated, the handle 29 adjacent its base portion 33 is shown as struck up at opposite sides to form upwardly projecting ears 59 (Figs. 3 to 8). Carried by these ears above the bore or vent passage 57 are shown an upper weight 61, an intermediate weight 63 and a lower weight 65. These weights are best illustrated in Figs. 17 and 23, and the manner of assembling them with each other and the ears by Figs. 3 to 6. The weight 61 as illustrated by these figures has a disk-like body formed with a lateral projection 67 from opposite sides of which downwardly extends a pair of spaced ears 69. These ears 69 are received between the pair of ears 59 on the handle 29, on which ears 59 they are pivotally mounted by pins 71 (Fig. 3) received in perforations 73 in said ears 59, the pins having screw-threaded shanks 75 received in screw-threaded openings 77 in the ears 69.

The intermediate weight 63, as shown, is substantially in the form of a flat disk, cut away at one side as indicated at 79 (Fig. 20), to form a tang 81, the upper and lower sides 83 of this tang converging toward each other as they approach the free end of the tang, as indicated in Fig. 21, to permit swinging of the weight relative to the upper and lower weights when the parts are in the assembled relation shown by Fig. 4.

The tang 81 of the weight 63 is received between the ears 69 of the weight 61 and is provided with a through perforation 85 in alignment with the perforations 87 formed in the ears 69 of the weight 61. Through these perforations extends a pin 89 (Figs. 4 and 6) which pivotally secures the weight 63 to the weight 61.

The lower weight 65 in outline is identical with the weight 63, as will be clear from a comparison of Figs. 20 and 22, except that the tang 91 of the weight 65 is not tapered. This tang 91, as shown, is provided with a perforation 93 which, in the assembled device shown by Figs. 4 and 6, is in alignment with perforations 95 formed in the ears 69 of the weight 61. Through these aligned perforations extends a pin 97 for pivotally securing the weight 65 to the weight 61.

The lower weight 65 is shown as provided with a perforation 99 (Figs. 4, 22 and 23) which at one end is formed with an enlarged diameter portion 101 forming a shallow recess for receiving a washer-like member 103 (Figs. 4 and 4ª) pressed into said recess. Loosely extending through the opening 105 of this washer-like member is the upwardly projecting shank 107 of a frusto-conical valve 109 adapted to seat on the valve seat presented by the upper peripheral edge of the bore 57 presenting the vent passage. At the under side of the member 103 the valve adjacent its base is formed with an annular radially extending flange 111 adapted to seat on the under side of said member for forcing the valve against its seat when the parts are in the position shown by Figs. 9, 10 and 11. At the upper side of the member 103 the shank 107 is formed with a reduced diameter portion 113 which receives a washer 115 resting on the shoulder 117 formed by this reduced diameter portion. At the upper side of the washer 115 the reduced diameter portion of the shank is riveted over, as indicated at 119, for securing the washer 115 to the shank of the valve. This washer acts to retain the valve in assembled relation with the member 103. The loose fit of the shank of the valve in the opening 105 permits the valve to move laterally relative to the lower weight 65 so that the valve will accurately seat on the valve seat.

As shown, the upper weight 61 is formed with a screw-threaded opening 121 (Figs. 4, 17, 18 and 19) into which is screw threaded a screw 123, the screw freely passing downwardly through openings 125 and 127, formed in the weights 63 and 65, respectively, in alignment with the screw-threaded opening 121. At its lower end the screw is adapted to bear on the upper side of the base portion 33 of the handle 29 so that by rotating the screw the upper weight 61 may be lifted relative to the cover of the pressure cooker.

At the opposite side of the valve 109 from the screw 123 the upper weight 61 is formed with a screw-threaded opening 129 into which is fixedly screw-threaded a downwardly projecting pin 131 (Fig. 4). This pin is formed with progressively enlarged diameter portions 133 and 135, the portion 133 extending through an opening 137 in the intermediate weight 63 and the portion 135 extending through an opening 139 in the lower weight 65. At its lower end the pin is formed with a head 141 below the lower weight 65. The enlarged diameter portion 135 of the pin forms with the smaller diameter portion 133 thereof an annular shoulder 143 of greater outer diameter than the diameter of the opening 137 in the intermediate weight 63, while the head 141 of the pin is of greater outside diameter than the diameter of the opening 139 in the lower weight 65.

The screw 123 at its upper end projects above the upper weight 61. This projecting portion of the screw is integrally formed with a collar 145. The portion 147 of the screw above the collar is screw-threaded, on which portion is screw-threaded a bushing 149 about which is fixedly molded a knob 151 for turning the screw. Clamped against the collar 145 by the bushing 149 and knob 151 is the base portion 153 of a spring arm 155 (Figs. 2, 3 and 9) the outer end 157 of which extends over the upper side of the upper weight 61. This spring arm is provided with a perforation 159 (Fig. 13) so that the portion 147 of the screw will pass through it. For securing the arm against rotation relative to the screw the collar 145 is provided with a perforation 161 (Fig. 12) in alignment with a perforation 163 (Fig. 13) in the spring arm, and through these perforations is passed a rivet 165 (Fig. 9). On its upper surface the weight 61 is formed with spaced recesses 167, 169, 171 and 173 (Figs. 3 and 17) which are connected by shallow arcuate grooves 175, while the spring arm is struck up to form a downwardly extending downwardly tapering projection 177 (Fig. 9) adapted to be resiliently received in these recesses and grooves. The recesses 167, 169, 171 and 173 serve to locate the screw in different rotative positions relative to the upper weight 61 by reason of the projection 177 on the spring arm snapping into them when moved into registry with them and automatically moving out of them when the arm is turned by the operator. The lower end of the projection 177 is adapted to bear on the bottoms of the grooves 175 and thus keep the under side of the spring arm from contacting with the upper surface of the weight 61. Further, these grooves serve to obscure the effect of the projection 177 in respect to its scratching the upper surface of the weight 61. Conveniently the weight 61 is provided with the upwardly projecting stop pins 178 which cooperate with the spring arm 155 to limit its extent of motion in opposite directions.

When the parts are in the position shown by Fig. 11 the three weights 61, 63 and 65 act conjointly to hold the valve 109 against its seat, the lower end of the screw 123 under these conditions being out of contact with the portion of the cover afforded by the base portion 33 of the cover handle 29. To move the screw into this position the knob 151 is rotated to cause the projection 177 on the spring arm 155 to register with and snap into the recess 167 on the upper weight 61. The position of the weights shown by Fig. 11 represents the maximum pressure that may be maintained in the pressure cooker, say a pressure of 15 pounds as indicated by the ordinal 15 applied to the upper side of the upper weight 61 as shown in Figs. 2 and 3.

If the knob is turned in a counter-clockwise direction, as viewed in Fig. 2, to cause the projection 177 of the spring arm to snap into the recess 169, the lower end of the screw will be caused to contact with the upper side of the cover portion 33 to swing the upper weight upward into the position shown by Fig. 10, under which conditions the valve will be held to its seat only by the weights 63 and 65. This may correspond to a pressure of 10 pounds to be maintained in the pressure cooker, as indicated by the ordinal 10 applied to the upper surface of the weight 61 adjacent the recess 169.

If the spring arm is moved farther in a counter-clockwise direction, to cause the projection 177 of the spring arm to snap into the recess 171, the upper weight 61 will be lifted farther to cause the shoulder 143 on the pin 131 to engage the under side of the weight 63 also to lift it as shown by Fig. 9. Under these conditions the valve is pressed against its seat only by the lower weight 65, which corresponds, for example, to the maintaining of a pressure in the pressure cooker of but 5 pounds as indicated by the ordinal 5 applied to the upper side of the upper weight 61 adjacent the recess 171.

If the spring arm is turned still farther in a counter-clockwise direction, to cause the projection 177 of that arm to snap into the recess 173, the head 141 of the pin 131 will engage the under side of the lower weight 65 also to lift it as shown in Fig. 4, such lifting of the weight 65 raising the valve 109 from its seat so that no pressure will be maintained in the pressure cooker, as indicated by the ordinal 0 applied to the upper side of the upper weight 61 adjacent the recess 173 as shown in Fig. 17.

It will be observed that by the construction above described the weights are swingably mounted at one side of the vent opening, a screw being positioned between the vent opening and pivotal mounting of the weights for lifting the upper weight, while the pin 131 provides a lost motion coupling between the weights effective to raise the weight 63 and then the weight 65 as the weight 61 is moved upward by the screw. It will also be observed that the pivoted lower weight forms a lever which supports the valve, the upward motion of the valve being multiplied because of this lever in respect to the distance the screw is moved longitudinally relative to the weight 61. Only a relatively slight movement need be imparted to the weight 61 by means of the screw, satisfactory results being obtained with a screw having 10 threads to the inch with the parallel axes of the screw and valve spaced apart 0.5 inch, as viewed in Fig. 11, and the other parts proportioned relative to such dimension as shown in the drawings. It will also be observed that only the upper end portion of the screw-thread of the screw illustrated plays any active part in lifting and lowering the weight 61, this screw-thread and the cooperating internal screw-threads of the weight 61 in effect forming a cam and cam-follower which act to lift or lower the weight when the screw is rotated.

For preventing the steam escaping from the vent opening being projected over the handle of the cooker cover there is preferably provided a shield 179 (Figs. 1 to 5 and 8). This shield bridges the space between the two ears 59 and acts substantially to close the space between the under side of the lower weight 65 and the top of the cover. The shield at each end is provided with portions 181 which engage the outer sides of the ears 59, these portions 181 at their free ends adjacent their lower edges having inturned tabs 183 which engage the edges of the ears adjacent the weights, and being formed with perforations 185 which receive the projecting ends of the pins 71, so that the shield will be securely held in assembled relation with the ears.

For reasons of safety it is important that care be taken by the operator to insure that the cooker is completely vented before attempting to remove the cover. Such complete venting may of course be secured in the cooker heretofore described by turning the screw to bring the spring arm 155 into the "0" position. However, if desired, the parts may be designed to permit the weights to be moved into the position shown by Fig. 15 for completely venting the cooker, the construction under such circumstances being identical with that heretofore described, except that the upper edge of the shield 187 then employed is lower than the shield 179 heretofore described as will be clear from a comparison of Figs. 4 and 14. In the position shown by Fig. 15 the three weights have been swung upward as a unit to move their centers of gravity past the vertical and cause the weight 61 to rest upon the top of the shield 187 for supporting the unit in that position, the normal position of the weights being that shown in Fig. 14. If desired, with the construction shown by Figs. 14 and 15 the "zero" position of the spring arm may be omitted by omitting the recess 173 in the upper surface of the weight 61 and suitably positioning the lower stop pin 178 as viewed in Fig. 3.

It will be understood that within the scope of the appended claims wide deviations may be made from the forms of the invention described without departing from the spirit of the invention.

I claim:

1. A vent valve adapted to be urged toward open position by pressure of the fluid to be vented and a weight for urging said valve toward closed position in opposition to such pressure, an auxiliary weight adapted to be supported by the first mentioned weight for augmenting the valve closing force exerted by the first mentioned weight, and manually operated mechanism comprising a part rotatably carried by the auxiliary weight and adapted operatively to bear against a relatively fixed part, said auxiliary weight and part carrying cooperating cam and cam-follower portions for adapting rotation of said part to cause lowering and lifting of said auxiliary weight relative to said fixed part into and out of a position in which it is supported by the other weight whereby both weights or only the said other weight may control the vent opening.

2. A vent valve adapted to be urged toward open position by pressure of the fluid to be vented and a weight for urging said valve toward closed position in opposition to such pressure, an auxiliary weight adapted to be supported by the first mentioned weight for augmenting the valve closing force exerted by the first mentioned weight, and manually operated mechanism comprising a part rotatably carried by the auxiliary weight and adapted operatively to bear against a relatively fixed part, said auxiliary weight and part carrying cooperating cam and cam-follower portions for adapting rotation of said part to cause lowering and lifting of said auxiliary weight relative to said fixed part into and out of a position in which it is supported by the other weight whereby both weights or only the said other weight may control the vent opening, there being a lost motion connection between said weights for causing lifting of said auxiliary weight by said part to a predetermined degree to lift the said other weight so that the vent opening is controlled by neither.

3. In a device of the character described a body having a vent opening, means for controlling said vent opening comprising a valve and a pair of weights for urging said valve toward its seat, which weights are swingably mounted on said body at one side of said vent opening in superimposed relation, and a manually operated screw screw-threadedly carried by the upper weight and extending through an opening in the lower weight adapted to bear at its lower end operatively against said body between said vent opening and the swingable mountings of said weights, whereby said screw may be rotated to lower said upper weight to cause it to be supported by the lower weight so that both control said vent opening, or to raise said upper weight to cause it to be supported by said screw so that only said lower weight controls said vent opening.

4. In a device of the character described a body having a vent opening, means for controlling said vent opening comprising a valve and a pair of weights for urging said valve toward its seat, which weights are swingably mounted on said body at one side of said vent opening in superimposed relation, a manually operated screw screw-threadedly carried by the upper weight and extending through an opening in the lower weight adapted to bear at its lower end operatively against said body between said vent opening and the swingable mountings of said weights, and a part carried by the upper weight adapted to engage and lift the lower weight upon predetermined upward movement of the former, whereby said screw may be rotated to lower said upper weight to cause it to be supported by the lower weight so that both control said vent opening, or to raise said lower weight to cause it to be supported by said screw so that only said lower weight controls said vent opening, or further to raise said upper weight to cause both to be supported by said screw so that neither controls said vent opening.

5. In a device of the character described a body having a vent opening, means for controlling said vent opening comprising a valve and at least three weights for urging said valve toward its seat, means mounting said weights on said body at one side of said vent opening in superimposed relation for vertical swinging, a first part rotatably carried by the upper weight extending through openings in the weights below it and adapted to bear at its lower end operatively against said body, said first part and upper weight having cooperating cam and cam-follower portions for causing rotation of said part when it so bears to swing said upper weight upwardly for lifting it relative to the body, a second part carried by the upper weight having spaced abutment surfaces for cooperating with the weight below said upper weight for causing the weights below said upper weight, starting with the uppermost thereof, to be progressively swung upwardly for lifting them when said upper weight is so swung for lifting it through predetermined distances, whereby said first part may be rotated to cause one or more of the weights above the lower weight to be supported by the latter so that the vent opening is controlled by a plurality of said weights, or to cause all the weights except the lower weight to be supported by said first part so that only the lower weight controls said vent opening.

6. The combination according to claim 4 in which the said part carried by the upper weight connects both weights so that they may be swung as a unit together with the screw into a position in which the center of gravity of such unit is at the side of the mounting of the unit opposite the vent opening.

7. In a device of the character described a body having a vent opening, a vent valve for said opening adapted to be urged into open position by the pressure of the fluid to be vented, a weight for urging said valve toward closed position in opposition to such pressure, an auxiliary weight, means operatively mounting said auxiliary weight on said body for vertical swinging, the two weights having cooperating portions for supporting the auxiliary weight on the first mentioned weight for augmenting the valve closing force of said first mentioned weight, and manually operated mechanism cooperating with said body and auxiliary weight for swinging said auxiliary weight relative to said body and first mentioned weight for raising and lowering said auxiliary weight to place such portions of the two weights selectively into and out of such cooperation.

8. The combination according to claim 7 in which means are provided for also operatively mounting the first mentioned weight of that claim on the body for vertical swinging, the manually operated mechanism comprising means cooperating with both weights and said body for swinging the auxiliary weight relative to said body and first mentioned weight for raising and lowering said auxiliary weight to place the cooperating portions of the two weights selectively into and out of cooperation and for swinging said first mentioned weight upwardly relative to said body when the auxiliary weight is raised a predetermined extent.

9. In a device of the character described a body having a vent opening, means for controlling said vent opening comprising a valve and at least three weights for urging said valve toward its seat, means mounting said weights on said body for vertical swinging in superimposed relation so that the lowermost is adapted to support those above it, lost motion couplings between at least all the weights except the lowermost for causing upward swinging of the uppermost weight into successive positions progressively to take up the lost motions of such couplings and progressively lift the weights so coupled, and a manually operated lifting device for swinging the uppermost weight for lifting it relative to said body into such successive positions, whereby only the lowermost weight or it and one or more of the weights above it may be caused to control said vent opening.

10. In a device of the character described a body having a vent opening, means for controlling said vent opening comprising a valve and at least three weights for urging said valve toward its seat, means mounting said weights on said body for vertical swinging in superimposed relation so that the lowermost is adapted to support those above it, lost motion couplings between all said weights for causing upward swinging of the uppermost weight into successive positions progressively to take up the lost motions of said couplings and progressively lift all the weights beneath it, and a manually operated lifting device for swinging the uppermost weight for lifting it relative to said body into such successive positions, whereby any number of the weights or none of them may be caused to control said vent opening.

11. In a device of the character described a body having a vent opening, means for controlling said vent opening comprising a valve and at least three weights for urging said valve toward its seat, means mounting said weights on said body for vertical movement in superimposed relation so that the lowermost is adapted to support those above it, lost motion couplings between at least all the weights except the lowermost for causing upward movement of the uppermost weight into successive positions progressively to take up the lost motions of such couplings and progressively lift the weights so coupled, and a manually operated lifting device carried by the uppermost weight and cooperating with said body for lifting said uppermost weight relative to said body into such successive positions, whereby only the lowermost weight or it and one or more of the weights above it may be caused to control said vent opening.

12. In a device of the character described a body having a vent opening, means for controlling said vent opening comprising a valve and at least three weights for urging said valve toward its seat, means mounting said weights on said body for vertical movement in superimposed relation so that the lowermost is adapted to support those above it, lost motion couplings between all said weights for causing upward movement of the uppermost weight into successive positions progressively to take up the lost motions of said couplings and progressively lift all the weights beneath it, and a manually operated lifting device carried by the uppermost weight and cooperating with said body for lifting said uppermost weight relative to said body into such successive positions, whereby any number of the weights or none of them may be caused to control said vent opening.

13. A pressure vessel provided with a vent opening, a valve for said opening adapted to be urged toward open position by pressure within the vessel, a swingable weight for urging said valve toward closed position, which weight comprises a first weight part which is swingably carried by said vessel and a second weight part which is swingably carried by said first weight part, said weight parts being positioned in superimposed relation, and manually operated mechanism for selectively causing the uppermost of said two superimposed weight parts to be supported by the lowermost whereby both are adapted to urge the valve toward closed position for maintaining a predetermined pressure within the vessel or the uppermost to be supported by the vessel whereby the lowermost only of the two is adapted to so urge said valve for maintaining a lower predetermined pressure within the vessel.

14. A pressure vessel provided with a vent opening, a valve for said opening adapted to be urged toward open position by pressure within the vessel, a swingable weight for urging said valve toward closed position, which weight comprises a first weight part which is swingably carried by said vessel and a second weight positioned below said first weight part and swingably carried thereby, and manually operated mechanism for selectively causing said first weight part to be supported by said second weight part whereby both are adapted to urge the valve toward closed position for maintaining a predetermined pressure within the vessel or the first weight part to be supported by the vessel whereby said second weight part urges said valve toward closed position without the first weight part so urging it for maintaining a lower predetermined pressure within the vessel.

15. A pressure vessel according to claim 13 in which the manually operated mechanism comprises a part carried by the uppermost of the two weight parts adapted to be selectively adjusted into contact with the vessel for causing the latter to support said uppermost weight part whereby the lowermost only of the two weight parts may control the valve for maintaining a predetermined pressure within the vessel or out of contact with the vessel for causing the lowermost of the two weight parts to support the uppermost whereby both weight parts may control the valve for maintaining a higher predetermined pressure within the vessel.

16. A pressure vessel according to claim 14 in which the manually operated mechanism comprises a part carried by the first weight part adapted to be selectively adjusted into contact with the vessel for causing the latter to support said first weight part whereby the second weight part only of the two weight parts may control the valve for maintaining a predetermined pressure within the vessel or out of contact with the vessel for causing said first weight part to be supported by said second weight part whereby both of said weight parts may control the valve for maintaining a higher predetermined pressure within the vessel.

17. A pressure vessel provided with a vent opening, a valve for said opening adapted to be urged toward open position by pressure within the vessel, a weight for urging said valve toward closed position, which weight comprises an upper weight part having spaced downwardly projecting portions pivotally connected to the vessel for mounting said upper weight part for swinging movement, and a second weight part having a portion between said downwardly projecting portions and pivotally connected thereto for swingably mounting said second weight part on said upper weight part, and a manually adjustable part carried by said upper weight part having a position of adjustment relative to said upper weight part in which it contacts with said vessel for causing the latter to support said upper weight part whereby to cause said second weight part only of the two weight parts to control the valve for maintaining a predetermined pressure within the vessel, said adjustable part having another position of adjustment relative to said upper weight part in which it is out of contact with the vessel for causing said upper weight part to be supported by said second weight part whereby both weight parts may control said valve for maintaining a higher predetermined pressure within the vessel.

ROLAND T. SPENCER.

References Cited in the file of this patent

UNITED STATES PATENTS

| Number | Name | Date |
|---|---|---|
| 1,474,192 | Gessler | Nov. 13, 1923 |
| 2,297,378 | Wittenberg | Sept. 29, 1942 |